United States Patent [19]
Davis et al.

[11] 3,794,389
[45] Feb. 26, 1974

[54] ADAPTIVE BRAKING SYSTEM

[75] Inventors: Dennis J. Davis; John E. Juhasz, both of Elyria, Ohio

[73] Assignee: The Bendix Corporation, Elyria, Ohio

[22] Filed: Dec. 21, 1972

[21] Appl. No.: 317,489

[52] U.S. Cl.............................. 303/21 P, 303/20
[51] Int. Cl............................................ B60t 8/08
[58] Field of Search ................ 188/181; 303/20, 21; 324/161–162; 340/53, 262–263

[56] References Cited
UNITED STATES PATENTS

| | | | |
|---|---|---|---|
| 3,556,610 | 1/1971 | Leiber | 303/21 P |
| 3,578,819 | 5/1971 | Atkins | 303/21 P |
| 3,640,588 | 2/1972 | Carp et al. | 303/21 P |

Primary Examiner—Duane A. Reger
Assistant Examiner—Stephen G. Kunin
Attorney, Agent, or Firm—Ken C. Decker; W. N. Antonis

[57] ABSTRACT

An adaptive braking system for an automotive vehicle is disclosed. The system is adapted to simultaneously control both wheels mounted on a common axle by a single modulating device and control unit. The control unit is designed to compensate for differences in the rates of wheel rotation of the wheels controlled by the single unit, and is also provided with circuitry which selects the wheel speed signal from either the high speed wheel or the low speed wheel. Furthermore, the system is designed to terminate adaptive control at some predetermined low level of wheel velocity so that the vehicle may be brought to a stop.

24 Claims, 7 Drawing Figures

ADAPTIVE BRAKING SYSTEM

BACKGROUND OF THE INVENTION

This invention relates to an adaptive braking system for an automotive vehicle.

Many adaptive braking systems for vehicles having fluid pressure operated brakes have been proposed. One such system is disclosed and claimed in copending patent application Ser. No. 302,633, filed Oct. 31, 1972, owned by the assignee of the present invention and incorporated herein by reference. While this system provides outstanding braking control under nearly all braking conditions, it does require a separate modulator and electronic control unit for each vehicle wheel. Obviously, the cost of such a system will be relatively high. However, it is possible to substantially reduce the cost of such a system if the control logic used in the system is modified so that a single modulator and control unit may be used to control a single axle of the vehicle. Of course, this must be done without substantial sacrifice of the performance of the basic system.

SUMMARY OF THE INVENTION

Therefore, an important object of our invention is to provide an adaptive braking system having a single modulator and control unit to control all of the brakes mounted on a common vehicle axle.

Another important object of our invention is to provide an adaptive braking system having single axle control with means to select the proper wheel speed signal to process for maximum brake effectiveness while preventing skidding of the vehicle wheels.

Still another important object of our invention is to provide an adaptive braking system having single axle control with circuitry to terminate adaptive control of the vehicle's brakes at the proper time when the wheel velocities have been reduced below a predetermined level so that the vehicle may be brought to a stop.

DETAILED DESCRIPTION

Figure 1:
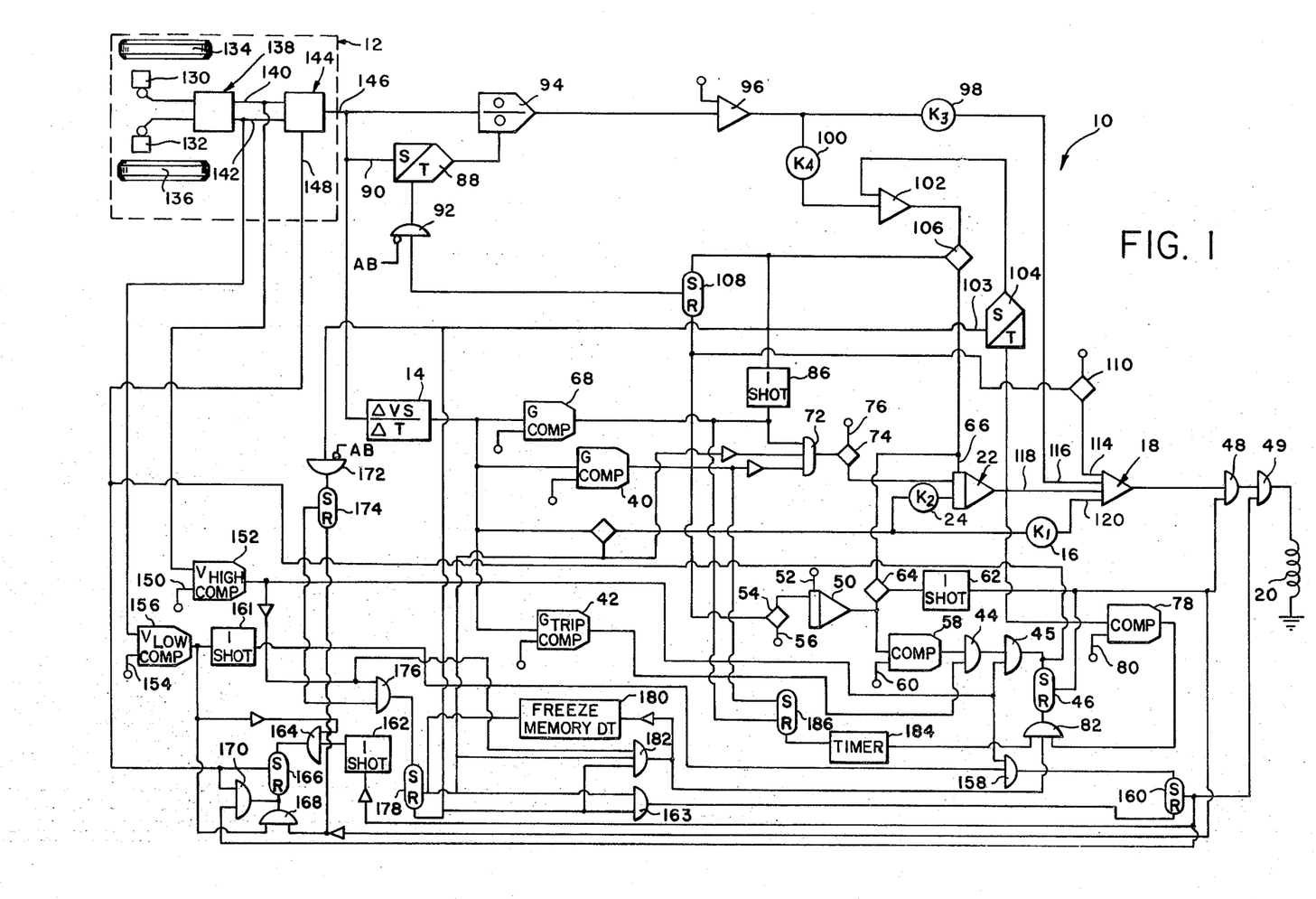
FIG. 1 is a functional block diagram of an adaptive braking system made pursuant to the teachings of our present invention.

Referring now to FIG. 1 of the drawings, an adaptive braking system generally indicated by the numeral 10 includes means generally indicated at 12 for producing an appropriate wheel speed signal to be processed by the circuitry to control application of the brakes on the axle controlled by the system 10. The means 12 will be described in detail hereinafter, but generally it selects one signal representing the rotational velocity of one of the wheels rotatably mounted on an axle, the brakes controlling the wheels on the axle being controlled by the system 10. The selected speed signal is differentiated in a differentiator 14 to produce a signal proportional to wheel acceleration and deceleration. The output signal of the differentiator 14 is multiplied by a constant $K_1$ in a multiplier 16, the output of which is transmitted to a duty-cycle generator generally indicated by the numeral 18. The duty-cycle generator 18 will be described in detail hereinafter, but in general, the duty-cycle generator 18 produces a pulsed output signal, the width of the pulses being modulated in accordance with the values of a plurality of input signals to the duty-cycle generator 18. The duty-cycle generator 18 includes a summer for summing the values of the signals from the plurality of sources, and the duty-cycle generator thereafter regulates the width of the pulses in accordance with the sum of the values of these signals. Of course, one of the input signals to the duty-cycle generator 18 is the wheel acceleration signal just referred to. In order to rationalize the vlaues of the input signals to the duty-cycle generator 18, it is necessary to multiply the inputs by a constant factor, such as the constant $K_1$ by which the output of the differentiator 14 is multiplied. The pulsed output produced by the duty-cycle generator 18 actuates a solenoid indicated generally at 20, details of which are more fully described in copending application Ser. No. 302,633, filed October 31, 1972.

A second input to the duty-cycle generator 18 is the output signal of an error term generator generally indicated by the numeral 22. The generator 22 is merely an integrating amplifier which integrates an input signal with respect to time and therefore provides an output signal which is averaged over a time period. Such integrating amplifiers are well known to those skilled in the art. One input to the error term generator 22 is also the output of the differentiator 14, multiplied by a constant $K_2$ in a multiplier 24. Therefore, the output of the error signal generator 22 will be proportional to the time average of the wheel acceleration and deceleration, and hence represents the history of wheel acceleration and deceleration.

Figure 2:
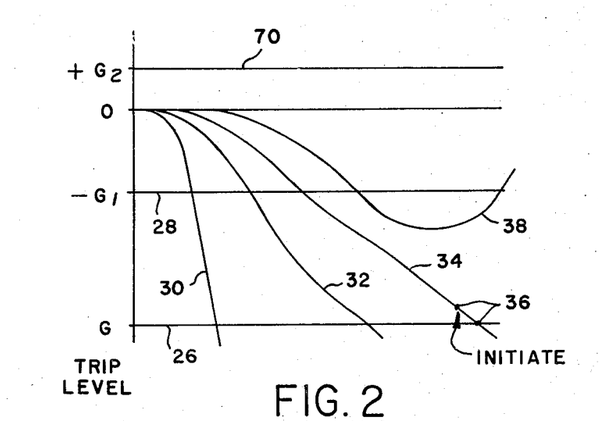
FIG. 2 is a graphical illustration of the operation of our system when an adaptive braking cycle is initiated.

Referring to FIG. 2, an adaptive braking cycle is initiated whenever the wheel deceleration, as represented by the output signal from the differentiator 14, drops below the $G_{trip}$ level represented graphically by line 26 in FIG. 2. Adaptive control is also initiated when the wheel deceleration level remains in the band defined between the $G_{trip}$ level and a $G_1$ level, which represents a deceleration level higher than the $G_{trip}$ level, for a predetermined time period. Furthermore, the initial condition set on the error term generator or integrating amplifier 22, and therefore the initial value of the output signal from the amplifier 22, is governed by the length of time that the wheel deceleration signal produced by the differentiator 14 remains in the band defined between the $G_{trip}$ level 26 and the $G_1$ deceleration level represented by the line 28 in FIG. 2. The $G_1$ deceleration level is below zero deceleration, and is higher than the $G_{trip}$ level represented by the line 26. For example, in the deceleration curve represented by the numeral 30 in FIG. 2, the wheel deceleration drops rather quickly from the $G_1$ level to the $G_{trip}$ level, so that a rather high initial condition is set on the integrating amplifier 22. Since the output of the duty-cycle generator 18 is dependent upon the magnitude of the output signal of the integrating amplifier 22, the pulsed output of the duty-cycle generator 18 will maintain the solenoid 20 on for a substantial portion of each cycle of the output signal of the generator 18. Therefore, the vehicle braking pressure will be decreased at a rather rapid rate. On the other hand, the wheel deceleration cycle represented by the line 32 in FIG. 2 requires a substantially longer time to decrease from the $G_1$ level to the $G_{trip}$ level than does the line 30. Therefore, a much lower initial condition will be set on the integrating amplifier 22, and consequently the solenoid 20 will remain on for a lesser percentage of the time of each cycle and consequently the braking pressure will be decayed at a lesser rate. On the other hand, the wheel deceleration represented by line 34 in FIG. 2 remains in the aforementioned band for a sufficient length of time that an adaptive braking cycle is initiated when wheel deceleration decreases to a level represented by point 36, so that an adaptive braking cycle is initiated before wheel deceleration drops before the $G_{trip}$ level. The initial condition set on the integrating amplifier in this case would be even less than the initial condition set by the cycle represented by the line 32 in FIG. 2, and consequently the solenoid 20 would remain on for an even smaller proportion of each cycle of the output of generator 18. In all cases, it should be noted that the solenoid 20 will be cyclically turned on and off, but the percentage of the time that it remains on as compared to the percentage that the solenoid 20 is off will vary depending on the output of the duty-cycle generator 18. Since the wheel deceleration represented by the curve 38 in FIG. 2 neither decreases below the $G_{trip}$ level nor remains below the $G_1$ level for the predetermined time period, no adaptive braking cycle would be initiated in this case.

The output signal from the differentiator 14 is transmitted to a first comparator 40 which compares the value of the output signal to the differentiator 14 with a deceleration reference level corresponding to the $G_1$ level illustrated by line 28 on FIG. 2. The output of differentiator 14 is also transmitted to the input of another comparator 42, which compares the value of the output signal with a value representing the $G_{trip}$ acceleration level illustrated by the line 26 in FIG. 2. Assuming that the value of the output of the differentiator 14 does drop below the $G_{trip}$ level causing comparator 42 to produce an output signal, this output signal is transmitted to one input of an OR gate 44, causing the latter to produce an output signal which is transmitted to an AND gate 45, the output of which sets a flip-flop 46. Assuming the other input of gate 45 is present, the flip-flop 46 produces an output signal which is transmitted to an AND gate 48. The other input of the AND gate 48 is connected to the output of the duty-cycle generator 18. The output of the AND gate 48 is transmitted to one input of an OR gate 49. Therefore, if the duty-cycle generator 18 is producing an output signal when the flip-flop 46 is producing an output signal, which should always be the case in the absence of a system malfunction, the solenoid 20 will be actuated. This is the manner in which the adaptive braking cycles represented by curves 30 and 32 in FIG. 2 are initiated.

Of course, when the output of differentiator 14 decreases below the $G_1$ reference level represented by line 28 in FIG. 2, which obviously occurs prior to its dropping below the $G_{trip}$ reference level represented by line 26 in FIG. 2, the comparator 40 produces an output signal. The output signal of the comparator 40 initiates operation of integrating amplifier indicated by the numeral 50. The initial value of the output of the integrating amplifier 50 is established at the initial condition terminal 52, which is connected with an electrical potential of a predetermined value. The output signal from the comparator 40 closes a switch 54, which causes the integrating amplifier 50 to decay the value of its output signal in a predetermined manner governed by the signal at the terminal 56 of the switch 54. The output signal of the integrating amplifier 50 is transmitted to a comparator 58 which compares the value of the output signal of the integrating amplifier 50 with a predetermined reference value transmitted to the terminal 60 of the comparator 58. When the output of the integrating amplifier 50 is decayed below the reference signal established at the terminal 60 of comparator 58, the latter produces an output signal which is transmitted to an input of the OR gate 44. Therefore, OR gate 44 will produce an output signal which sets the flip-flop 46 in the manner described above. Since the other input of the OR gate 44 is the output of the comparator 42, the flip-flop 46 will be set when the output of the comparator 42 produces an output signal, which is the case when a cycle proceeds according to the curves 30 and 32 on FIG. 2, or when the comparator 58 produces an output signal, as is the case when the adaptive braking cycle proceeds according to curve 34 on FIG. 2. The output signal of the flip-flop 46 is not only transmitted to the AND gate 48, but also pulses a one-shot multivibrator 62. The output of the one-shot 62 closes a switch 64, thereby transmitting the value of the output signal of the integrating amplifier 50 to the initial condition terminal 66 of the error term generator 22. Therefore, whenever an adaptive braking control is initiated, the initial value of the output of the error term generator 22 is governed by the value of the output signal of the integrating amplifier 50. Since the output signal of the latter is governed by the length of time that the wheel acceleration signal remains in the band defined between the $G_1$ and $G_{trip}$ deceleration levels, the initial value of the output of the error term generator 22 will also be a function of this time period.

The output of the differentiator 14 is also transmitted to the input of another comparator generally indicated by the numeral 68. The comparator 68 compares the value of the output signal of the differentiator 14 with a $G_2$ reference level and produces an output signal whenever the value of the wheel acceleration drops below the $G_2$ reference level. The $G_2$ reference level represents a slightly positive acceleration level, as represented by the line 70 in FIGS. 2 and 3. The output of the comparator 68 is transmitted to an input of an AND gate 72, the other input of which is connected to the inverted output signal of the comparator 40. Therefore, the AND gate 72 will produce an output signal whenever the wheel deceleration is in a band defined between the $G_1$ and $G_2$ acceleration and deceleration levels, as represented by the lines 28 and 70 in FIG. 2. The output of the AND gate 72 closes a switch 74, which transmits a signal at the terminal 76 to the negative input of the error term generator 22. Therefore, as long as the wheel deceleration level remains in the band between the $G_1$ deceleration level and the $G_2$ acceleration level, the output of the error term generator will be decayed at some predetermined rate governed by the value of the signal at the terminal 76. This value is set at a rather high level, so that the output signal of the error term generator 22 decays at a very fast rate as long as the switch 74 is closed.

The output of the error term generator 22 is transmitted to a comparator 78, which compares the value of the output signal of the generator 22 with some predetermined reference value established at the terminal 80 of the comparator 78. When the value of the output of error term generator 22 falls below the value of the terminal 80, comparator 78 generates an output signal which is transmitted to the reset input of the flip-flop 46, thereby causing the latter to terminate the control signal to the solenoid 20. It will be noted that the value of the output signal of the error term generator 22 will fall below the value of the signal at the terminal 80 a relatively short time after the switch 74 is closed. Therefore, the adaptive braking cycle is terminated rather quickly when the value of the wheel deceleration signal remains in the band between the wheel deceleration between the $G_1$ deceleration level and $G_2$ acceleration level. However, the value of this signal is permitted to pass through this band during a wheel acceleration or deceleration without terminating the cycle. The value of the signal at the terminal 76 must therefore be adjusted accordingly.

The wheel slip function is defined as $1 - V_w/V_r$, where $V_w$ is the wheel speed sensed by the wheel speed sensor 12 and $V_r$ is a reference velocity to be further defined hereinafter. The input of a memory element 88 is connected to the output of the wheel speed sensor 12, through the appropriate processing equipment (not shown). The output of an OR gate 92 is connected to the track input of memory element 88. One input of the OR gate 92 is connected to the output of a flip-flop 108; the other input of the gate 92 is connected to the inverted output of the flip-flop 46. The set input of the flip-flop 108 is connected to the output of one-shot 86, the input of which is connected to the output of the comparator 68. Therefore, when wheel deceleration drops below the $G_2$ reference level, one-shot 86 will be fired, therefore setting flip-flop 108 whereby the latter transmits a signal to OR gate 92. The memory unit 88 therefore normally stores the first value of a signal transmitted to the input terminal 90 of the latter after initiation of an adaptive braking cycle and when a signal is generated by flip-flop 108. The output of the memory element 88 is transmitted to the input of a divider 94, the other input of which is connected to the output of the wheel speed sensor 12. The divider 94 divides the wheel speed generated by the wheel speed sensor 12 by the value stored in the memory element 88. The output signal of the divider 94 is transmitted to the input of the amplifier 96, which subtracts the value of the output of the divider 94 from unity, to form the quantity of $1 - V_w/V_r$, which was defined hereinabove as the wheel slip. This wheel slip quantity is multiplied by a constant $K_3$ in the multiplier 98 and then is transmitted to one of the input terminals of the duty-cycle generator 18. The output of the amplifier 96 is also multiplied by a constant $K_4$ in the multiplier 100, the output of which is connected to one input of a summer 102. The other input of the summer 102 is connected to the output of a memory element generally indicated by the numeral 104, the input of which is connected to the output of the error term generator 22. The memory element 104 normally tracks the value of the output signal of the error term generator 22, but stores this value whenever a signal is transmitted to the store input 103 of the memory element 104. Store input 103 is connected to the output of the one-shot 86, so that the memory 104 stores the value of the error term generator 22 when the one-shot 86 is fired by wheel acceleration dropping below the $G_2$ reference level. The one-shot 86 also closes a switch 106, which connects the output of the summer 102 with the initial condition input 66 of the error term generator 22. Therefore, on the initial adaptive braking cycle, the initial condition of the error term generator 22 is set by the output of the integrating amplifier 50, but on succeeding anti-skid cycles, the initial condition of the error term generator 22 is set as a function of the sum of the wheel slip term, (the output of the amplifier 96) and the value of the output of the error term generator 22. This initial condition is reset by the one-shot 86, which is fired whenever the wheel deceleration drops below the $G_2$ reference level, and therefore the initial condition on the error term generator 22 is reset whenever wheel deceleration drops below the $G_1$ reference level.

As described hereinabove, the output of the one-shot 86 also sets the flip-flop 108, the output of which is transmitted to the one input of an OR gate 92, the output of which is connected to the track input of the memory element 88. Therefore, immediately after the switch 106 is closed to establish the initial condition on the error term generator 22, the memory element 88 begins to track the actual wheel speed. Since the output of the divider 94 will be unity as long as the memory element 88 is tracking the wheel speed, the wheel slip term is set equal to zero immediately after the wheel acceleration drops below the $G_2$ reference level and remains equal to zero until the flip-flop 108 is reset. The reset input of the flip-flop 108 is connected to the output of the comparator 40, so the flip-flop 108 will be reset whenever the wheel deceleration drops below the $G_1$ reference level. This extinguishes the output of the flip-flop 108 to the track input 92, thereby causing the memory element 88 to memorize the existing value of wheel speed, which is used in the slip calculations accomplished by the divider 94 and amplifier 96 until the wheel value of the wheel deceleration again drops below the $G_2$ wheel reference level from a value higher than the $G_2$ reference level.

The output signal of the comparator 40 also closes a switch 110, to transmit the value of the signal on the terminal 114 to the duty-cycle generator whenever the wheel deceleration drops below the $G_1$ level, and to remove this signal whenever the value of the deceleration signal climbs above the $G_1$ level.

Therefore, the output signal generated by the duty-cycle generator 18 will be a function of the sum of the various input signals to the latter. For example, the input signal transmitted to input 114 of the duty-cycle generator 18 will be a predetermined amount when the wheel deceleration is below the $G_1$ level, and will be zero when wheel deceleration is above the $G_1$ level. The signal transmitted to the input terminal 116 of duty-cycle generator 18 will be a function of wheel slip, defined as the quantity $1 - V_w/V_r$, where $V_w$ is the instantaneous wheel velocity and $V_r$ is a reference wheel velocity. The signal transmitted to input terminal 118 of the duty-cycle generator 18 is equal to the output signal of the error term generator 22. Finally, the signal transmitted to the input terminal 120 of duty-cycle generator 18 will be a function of the wheel acceleration and deceleration, as generated by the differentiator 14.

Figure 4:
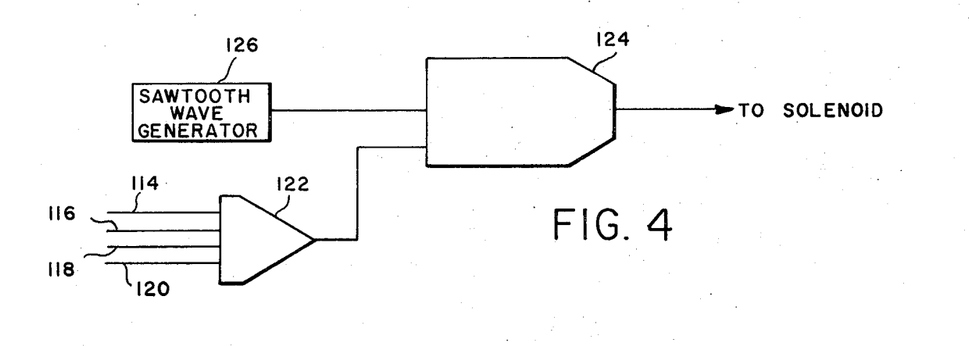
FIG. 4 is a detailed block diagram illustrating the operation of the duty-cycle generator used in our adaptive braking system.
Figure 5:
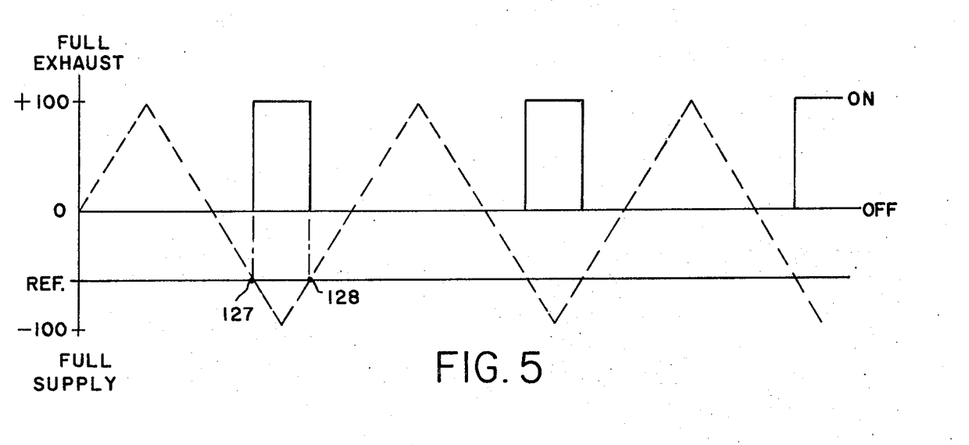
FIG. 5 is a graphical representation of the manner in which pulses are generated by the duty-cycle generator.

Referring now to FIGS. 4 and 5, the duty-cycle generator 18 is described in detail. Generator 18 includes a summer 122 which sums the value of the signals appearing in the input terminals 114, 116, 118, and 120. The output of the summer 122 is transmitted to the reference terminal of a comparator 124. The input of the latter is connected to the output of a sawtooth wave generator 126. The sawtooth wave generator 126 produces a sawtooth wave output, the amplitude of which is equal to the predetermined maximum permissible amplitude of the sum of the input signals from the summer 122, and the frequency of which is also a predetermined value. The comparator 124 compares the sawtooth wave with the reference signal which is equal to the output of the summer 122. Referring now to FIG. 5 of the drawings, the output of the sawtooth generator is shown by the dashed lines. Assigning an arbitrary value of plus 100 to the maximum value of the sawtooth wave, and a similar arbitrary value of minus 100 to the minimum value of the sawtooth wave, the amplitude of the output signal of the summer 122 must be equal to either plus or minus 100, or to some intermediate value. For example, a value of plus 100 for the sum of the various signals on the terminals 114–120 would call for the solenoid 20 to be on continually, thereby rapidly exhausting the brake pressure in the vehicle brake actuators. Similarly, the arbitrary value of minus 100 would call for the solenoid to be off at all times, permitting unrestricted communication between the brake actuators and the brake pressure supply, so that braking pressure would build quite rapidly. Various intermediate values would call for different proportions of exhaust and supply. As illustrated in FIG. 5, assuming that the input to the reference terminal of the comparator 124 is equal to the minus 70 points, the output of the comparator 124 will produce an output signal only when the value of the sawtooth wave is below minus 70 points, as occurs between points 127 and 128 on FIG. 5. Therefore, the solenoid will be on through a much smaller portion of the cycle than the solenoid will be off. As is readily apparent to those skilled in the art, if the signal to the reference input of the comparator 124 is above zero, the solenoid 20 will be on more than it will be off, and if the input to the reference terminal of comparator 124 is below zero, the solenoid 20 will be off for a longer period of time during each cycle than it will be on. Similarly, if the value to the reference input of the comparator 124 is equal to zero, the solenoid 20 will be on and off for substantially equal periods of time. In other words, when the value of the reference signal is below zero, braking pressure will be established at a higher level; if the value of the signal transmitted to the reference terminal of comparator 124 is above zero, braking pressure will be established at a lower level. It should be remembered, of course, that braking pressure is decayed when the solenoid is on and is increased when the solenoid is off.

The means 12 which produces the appropriate wheel speed signal and the manner in which the device 12 is controlled will now be described in detail. A pair of wheel speed sensors 130, 132 are mounted adjacent each of the wheels 134, 136, the brakes of which are controlled by the system 10. Appropriate sorting circuitry generally indicated by the numeral 138 produces an output signal on the terminal 140 thereof proportional to the rotational velocity of the faster rotating wheel 134 or 136 and an output signal on the terminal 142 proportional to the rotational velocity of the slower rotating wheel. The sorting circuitry 138 is of a type well known to those skilled in the art and is fully disclosed, for example, in U. S. Pat. Nos. 3,535,004 and 3,494,671, both owned by the assignee of the present invention and incorporated herein by reference. A switching circuit generally indicated by the numeral 144 normally transmits the signal on the terminal 140 (representing the faster rotating wheel) the input terminal 146 of the adaptive braking system 10. However, when a signal is transmitted to the input terminal 148 of the switching circuitry 144, the signal representing the slower rotating wheel is transmitted to the terminal 146. Again, the switching circuit 144 may be of the type disclosed in the above-referenced patents, or any other suitable type.

The signal on the terminal 140 is compared with a predetermined reference signal transmitted to terminal 150 of a comparator 152, which generates an output signal if the input signal exceeds the value of the reference signal. Similarly, the velocity representing the slower rotating wheel is compared with a reference velocity on an input terminal 154 of a comparator 156, which generates an output signal if the input signal is less than the value of the reference signal. The values of the reference signals on the terminals 150 and 154 represent fairly low velocity levels. For example, the signal on terminal 150 may represent a velocity of 9 mph, while the signal on terminal 154 may represent a velocity of 6 mph. The output of the comparator 152 is transmitted to the other input of the AND gate 45, so that the signal to the set input of flip-flop 46, which initiates the adaptive braking cycle, will be inhibited when velocity of the faster rotating wheel is less than the reference velocity. The output signal of the comparator 152 is also transmitted to one input of an AND gate 158, the other input of which is connected to a one-shot 161, which is fired by the output of the comparator 156. Therefore, the AND gate 158 will produce an output signal when the fastest rotating wheel is rotating at a speed higher than its reference signal and the wheel rotating at the lower speed is rotating slower than its reference signal. This situation is defined as the unbalanced mode of operation. Other modes of operation are defined as the primary mode, in which both wheels are rotating above their reference levels, and the locked mode, defined as when the faster rotating wheel is rotating at a speed below its reference and the slower rotating wheel is rotating at a speed either above or below its reference level.

The output of the AND gate 158 sets an unbalanced mode flip-flop 160 to declare the unbalanced mode of operation. The output of flip-flop 160 is fed through OR gate 49 to actuate the solenoid 20. The other input to the OR gate 49 is the output of the duty-cycle generator 18, so that, when the flip-flop 160 is set, the duty-cycle generator 18 is overridden and a signal is continually transmitted to solenoid 20 to maintain actuation of the latter. Therefore, the fluid braking pressure is decayed at the maximum possible rate after the flip-flop 160 is set. The inverted output of the flip-flop 160 is also transmitted to fire a one-shot 162, the output of which is transmitted to one input of an AND gate 164. THe other input of AND gate 164 is connected to the inverted output of comparator 156. Therefore, if the slower rotating wheel is rotating above its reference level when flip-flop 160 is reset, the AND gate 164 sets the select low flip-flop 166. It should be remembered that, of course, for the flip-flop 160 to be set in the first place, the slower rotating wheel must have been rotating at a rate slower than that of its reference. However, at the time the flip-flop 160 is reset, the slower rotating wheel must have recovered sufficiently to be rotating at a rate above its reference. The reset input of the flip-flop 160 is connected to the output of one-shot 86 through an OR gate 163. As described hereinabove, one-shot 86 is fired when wheel deceleration of the selected wheel drops below the $G_2$ acceleration level from a value greater than the $G_2$ acceleration level. Since the $G_2$ acceleration level is only slightly greater than zero acceleration, the wheel speed will have recovered to its maximum for that cycle, since the one-shot 86 is fired just before the wheel again begins to decelerate, and therefore, when wheel speed is maximum and just before wheel speed again begins to slow down. At this speed, the wheel speed is substantially synchronous with the speed of the vehicle. When the one-shot 86 is fired, the flip-flop 160 is reset, thereby firing the on-shot 162 as described hereinabove. Of course, immediately after the one-shot 86 times out, the flip-flop 160 may be set if the outputs of the comparators 152 and 156 are appropriate, but this is relatively unlikely.

When select low flip-flop 166 is set, a signal is transmitted to input terminal of wheel speed selector switching circuit 144, causing the latter to select the rotational velocity of the low speed wheel. This voltage is impressed on the terminal 146 of switching circuit 144 and is used for adaptive braking control as described hereinabove. However, it is possible that adaptive control of the vehicle's brakes has not yet been initiated when flip-flops 160 and 166 are set. For this reason, the output of the flip-flop 166 is transmitted to the set input of flip-flop 46, to thereby initiate adaptive control of the vehicle's brakes whenever the wheel speed of the slowest rotating wheel is used for control.

The output of an OR gate 168 is connected to the reset terminal of flip-flop 166. One input of OR gate 168 is connected to the inverted output of the adaptive braking flip-flop 46. The other input of OR gate 168 is connected to the output of comparator 156. Therefore, flip-flop 166 will be reset whenever adaptive control of the vehicle's brakes is terminated, or when the speed of the slower rotating wheel drops below its reference. Furthermore, the output of an AND gate 170 is connected to the reset input of flip-flop 166. One input of gate 170 is connected to the output of the flip-flop 166, and the other input of gate 170 is connected to the output of unbalanced mode flip-flop 160. Therefore, flip-flop 166 will be reset if the unbalanced mode flip-flop 160 is activated after the select low flip-flop 166 is activated.

One input of an AND gate 172 is connected to the output of the one-shot 86, and the other input is connected to the output of the adaptive braking flip-flop 46. The set input of a flip-flop 174 is connected to the output of the AND gate 172, so that the flip-flop 174 will be activated at all times after an initial cycle of adaptive control. The reset input of the flip-flop 174 is connected to the inverted output of the adaptive braking flip-flop 46, so that the flip-flop 174 will reset when adaptive control is terminated. The output of flip-flop 174 is transmitted to one input of an AND gate 176, the other input of which is connected to the inverted output of comparator 152. Therefore, AND gate 176 produces an output signal anytime after the first adaptive braking cycle that the rotational speed of the high speed wheel drops below its reference. The output of AND gate 176 sets a locked mode flip-flop 178. The output of flip-flop 178 enables a freeze duty-cycle memory 180. When enabled, the memory 180 "freezes" the output of the duty-cycle generator 18, thereby maintaining the rate that the solenoid 20 is pulsed a constant. The memory 180 memorizes the output of the summer 122 when the memory 180 is enabled, and transmits this value to the comparator 124, until the enable is removed.

The inverted output of the flip-flop 178 is also transmitted to the AND gate 72, so that the output of the latter is inhibited while the system is in the locked mode. The reset input of flip-flop 178 is connected to the output of one-shot 86, as is one input of an AND gate 182. The other inputs of AND gate 182 are connected to the output of the locked mode flip-flop 178 and to the inverted output of the comparator 152. Therefore, AND gate 182 generates an output signal when, at synchronous speed and in the locked mode, the velocity of the faster rotating wheel is below the corresponding reference velocity. This signal is transmitted to the reset terminal of adaptive braking flip-flop 46 through OR gate 82, and thereby terminates adaptive control.

A timer 184 has an output connected to the gate 82 and an input connected to a flip-flop 186. The timer is designed to produce an output signal a predetermined time after flip-flop 186 is set, unless the latter is reset in the interim. The set and reset inputs of flip-flop 186 are connected to the outputs of comparators 40 and 68, respectively. Therefore, adaptive control is terminated unless the wheel accelerates between the $G_1$ and $G_2$ levels within the period of the timer 184.

MODE OF OPERATION

In operation, wheel speed sensors 130 and 132 produce signals corresponding to the rotational velocities. Sorting circuitry 138 generates a signal or terminal 140 proportional to the faster rotating wheel and a signal or terminal 142 proportional to the slower rotating wheel. If both of the wheels are to be controlled by a single control channel, one of these signals must be chosen to be processed by the systems. Obviously, if both signals are relatively close to one another and both of the wheels are rotating relatively rapidly, it makes little difference which wheel is chosen for control. In our invention, the high speed wheel is arbitrarily chosen, and therefore, the switching circuitry 144 selects the high speed wheel at all times unless a signal is transmitted to the terminal 148. The condition in which both wheels are rotating at speeds above their reference levels is defined at the primary mode of operation. However, there are conditions in which it is desirable to select the low speed wheel for control. This occurs, for example, when there is a gross disparity between wheel speeds. When this occurs, more efficient braking is achieved if the low speed wheel is used for control, unless the low speed wheel is rotating so slowly that locking is imminent. In this case, the high speed wheel is used and the low speed wheel is ignored, since the vehicle will remain stable even if the low speed wheel locks. Operation of the adaptive braking system when there is a gross disparity between wheel speeds is defined as the unbalanced mode of operation. Clearly, adaptive control must be terminated at some low wheel speed in order to stop the vehicle. However, it must be assured that the wheels are rotating slowly because the vehicle is slowing down and not because the wheels are locking. Operation of the system when both wheels are rotating below the high speed wheel reference is defined as the locked mode of operation.

Figure 3:
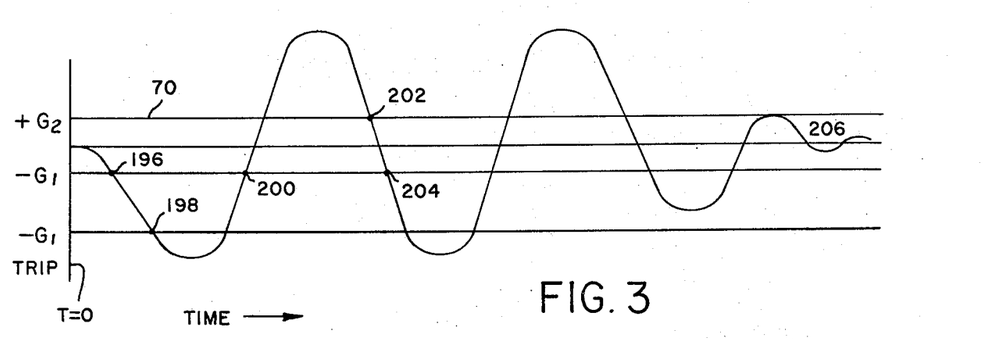
FIG. 3 is a graphical representation of the cyclic operation of our system.

Assuming operation in the primary mode (select high speed wheel for control), and assuming that a brake application is initiated by the vehicle operator at a time $t = 0$ in FIG. 3, the differentiator 14 produces an output signal proportional to the acceleration and deceleration of the control wheel. As illustrated in FIG. 3, the wheel begins to decelerate and when the wheel deceleration passes through the $G_1$ reference level, as indicated in FIG. 3 at point 196, the comparator 40 produces an output signal which closes the switch 54 and thereby initiates the integrating amplifier 50 which then decays the initial condition set at terminal 52 of the latter in a predetermined manner. When the wheel deceleration passes through the $G_{trip}$ level, as indicated by point 198 in FIG. 3, the output of comparator 42 produces an output signal which sets the flip-flop 46 which initiates the adaptive braking cycle. Of course, had the wheel deceleration remained in the band between $G_1$ and $G_{trip}$ for a sufficient length of time, the comparator 58 would have produced an output signal which would have set the flip-flop 46. In any event, when the flip-flop 46 is set, one-shot 62 is fired to close the switch 64 which sets the initial condition on terminals 66 of error term generator 22 equal to the output signal of the integrating amplifier 50. At the same time, the wheel deceleration is multiplied by the constant $K_1$ by multiplier 16 and transmitted to the duty-cycle generator 18. This wheel acceleration or deceleration signal is also multiplied by a constant $K_2$ by multiplier 24 and fed into the error term generator 22. Upon the setting of flip-flop 46, the memory element 88 memorizes the instantaneous wheel speed. On the subsequent antiskid cycle, this wheel speed is used as a reference velocity in calculating wheel slip, which is also fed into the duty-cycle generator 18 after being multiplied by a constant $K_3$ by multiplier 98. As described hereinabove, the duty-cycle generator generates a pulse train in which the width of the pulses are modulated according to the magnitudes of the input signals on terminals 120, 118, 116, and 114. As long as the wheel is decelerating, the output of duty-cycle generator will cause the solenoid 20 to exhaust braking pressure for a substantial portion of the cycle, to permit the wheel to reaccelerate. When the wheel reaccelerates past the minus $G_1$ level, as indicated by point 200 in FIG. 3, the AND gate 72 produces an output signal which closes switch 74, thereby causing the output signal of the error term generator 22 to decay at a predetermined rate. However, since wheel acceleration rapidly passes through the band defined between the minus $G_1$ and plus $G_2$ acceleration levels, the output signal of the error term generator 22 does not decay for a sufficient amount to cause the comparator 78 to produce an output signal and the adaptive braking mode of operation continues. As the wheel acceleration becomes positive, the various inputs to the duty-cycle generator will cause the pulse train to be modulated in such a manner that the solenoid 20 permits braking pressure to build much faster than it decays, thereby again decelerating the controlled wheel. When the wheel deceleration drops below the $G_2$ level as indicated by the point 202 on FIG. 3, one-shot 86 is fired which enables memory element 104 to store the instantaneous value of the output signal of the error term generator 22. Also, the one-shot 86 closes switch 106, which causes the output of summer 102, which is the sum of the values stored in the memory element 104 plus the slip calculated by amplifier 96 multiplied by the constant $K_4$ in multiplier 100, to be transmitted to the initial condition terminal 66 to the error term generator 22. Therefore, the output signal of the generator 22 is set equal to this value at that instant. Furthermore, the one-shot 86 sets flip-flop 108 which causes the memory element 88 to track the velocity of the controlled wheel. Therefore, wheel slip after the wheel deceleration drops below the $G_2$ level, as at point 202, is set equal to zero. As illustrated in FIG. 3, the wheel deceleration continues to decrease, and when it drops below the minus $G_1$ reference level, as indicated at point 204 in FIG. 3, the output of comparator 40 resets the flip-flop 108 so that the memory element 88 memorizes the instantaneous value of the wheel velocity. This value is used in the wheel slip calculations accomplished by the divider 94 and amplifier 96 until the track input 92 of the memory element 88 is again initiated by the wheel deceleration dropping below the $G_2$ level.

The adaptive braking system in its adaptive mode operates as described above for any necessary number of cycles to prevent the wheel from locking or until the vehicle is brought to a safe stop. Of course, after the system is operated for a predetermined number of cycles, the wheel deceleration should eventually be controlled to such an extent that it remains in the band defined between the minus $G_1$ and plus $G_2$ wheel deceleration levels, unless of course, the vehicle has been brought to a stop in the interim. Beginning at the point 206 on FIG. 3, for example, the wheel deceleration and acceleration remains within the band defined between the minus $G_1$ and plus $G_2$ reference levels. When this occurs the AND gate 72 closes switch 74 to cause the error term generator output signal to decay at some predetermined function. The comparator 78 compares this output signal with some predetermined reference value, and when the output signal of the generator 22 drops below this reference value, the flip-flop 46 is reset to thereby terminate the adaptive braking cycle. Of course, if the value of the wheel acceleration signal is such that the output signal of the error term generator 22 becomes less than the value on terminal 80, the comparator 78 will also terminate the adaptive braking cycle.

It will be noted that when the wheel decelerates past the minus $G_2$ level the output of the comparator 40 closes the switch 110 to add a signal of predetermined magnitude to the input of duty-cycle generator 18. This feature is optional, and merely "forces" the duty-cycle generator 18 to bias the valve 20 toward decay whenever wheel deceleration drops below the $G_1$ level. Of course, when the wheel deceleration is above the $G_1$ level, the switch 110 is again opened, thereby removing the signal from the terminal 114 of duty-cycle generator 18.

At all times while the vehicle is in motion, comparators 152 and 156 continuously monitor the wheel speeds, even if adaptive control has not been initiated.

Figure 6:
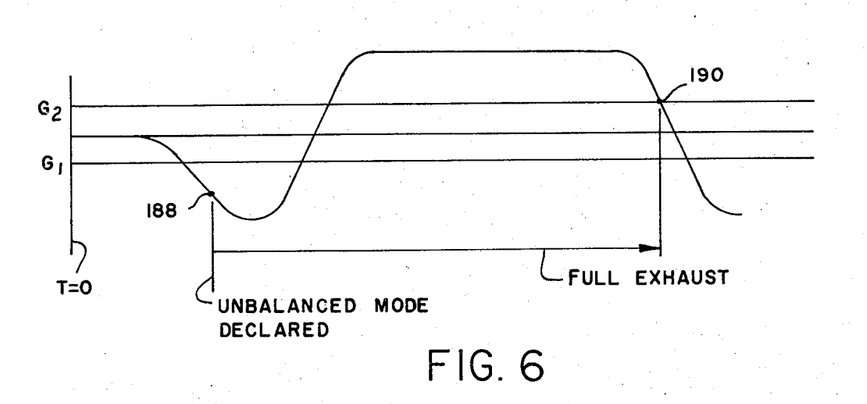
FIG. 6 is a graphical representation of the operation of our system when the latter functions in the unbalanced mode of operation.

If the comparators 152 and 156 produce output signals, indicating that the low speed wheel is rotating below its corresponding reference level, but the high speed wheel is rotating above its reference level, AND gate 158 sets the flip-flop 160, thereby declaring the unbalanced mode of operation, it being remembered that adaptive control might not have been initiated. When flip-flop 160 is set, solenoid 20 is activated to decay braking pressure at a constant rate. Referring to FIG. 6, the unbalanced mode is declared, for example, at point 188. The brake pressure decay causes the wheel to accelerate, as illustrated by the flat portion of the curve. When wheel acceleration drops below the $G_2$ level, as represented by point 190 in FIG. 6, the wheel may be assumed to be substantially synchronous with vehicle speed, since point 190 occurs just before the wheel again begins to decelerate and after the wheel has accelerated for the maximum possible time. When this occurs, one-shot 86 is fired to reset the flip-flop 160. After the time period of one-shot 86 expires, flip-flop 160 may be reset if the unbalanced mode still exists. However, if the speed of the lower wheel has recovered to a value above its reference, AND gate 164 sets select low flip-flop 166, the output of which is transmitted to switching circuitry 144 to cause the latter to select the low speed wheel for control. The system 10 then operates exactly as described above, except the slower wheel is used for control instead of the faster wheel. When flip-flop 166 is set, flip-flop 46 is also set, to initiate adaptive control if adaptive control has not already been initiated by one of the methods described above. Flip-flop 166 is reset to select high if adaptive control is terminated, if the low speed wheel drops below its reference, or if flip-flop 160 is set to declare the unbalanced mode.

Figure 7:
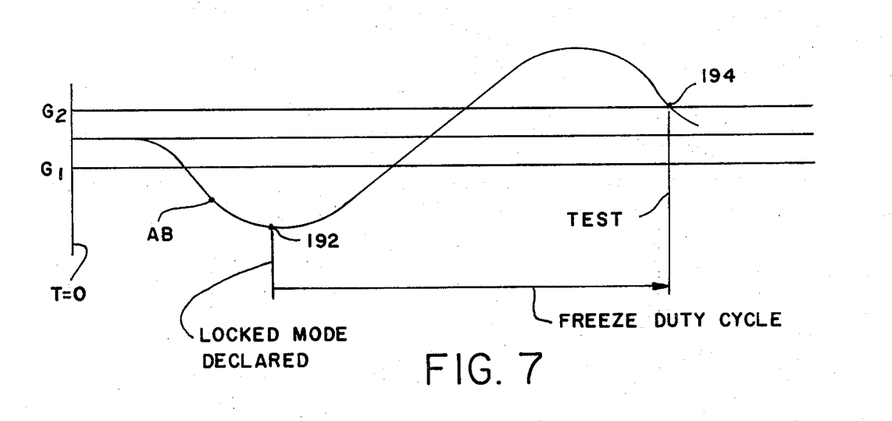
FIG. 7 is a graphical representation of the operation of our system when the latter functions in the locked mode of operation.

If both wheels are rotating below the reference level of the high speed wheel, it is desirable to terminate adaptive control if these low wheel speeds are substantially synchronous with vehicle speed, indicating that the vehicle is about to stop, but it is necessary to continue adaptive control if the vehicle is still moving at a substantial speed and the low wheel speeds indicate an incipient skidding condition. This situation in which both wheels are rotating at less than the high speed reference, is defined as the locked mode, but this mode is inhibited on the first adaptive braking cycle. After the first cycle, flip-flop 174 generates a signal which is transmitted to AND gate 176. If the comparator 152 generates a signal indicating that the high speed wheel is below its reference, AND gate 176 generates a signal setting the locked mode flip-flop 178 to declare the locked mode, as indicated by point 192 on FIG. 7. The output of flip-flop 178 resets the unbalanced mode flip-flop 160, so that the locked mode overrides the unbalanced mode. The output of flip-flop 178 also enables the freeze duty-cycle memory 180, which "freezes" the duty output of the duty-cycle generator 18 so that the rate of brake pressure decay remains constant. The wheel then accelerates, as illustrated in FIG. 7, until the wheel acceleration drops below the $G_2$ acceleration level indicated by numeral 194. As described above, the point 194 indicates that the wheel is synchronous with vehicle speed. At this time, AND gate 163 generates a signal if the wheel speed is still less than its reference. This signal resets adaptive braking flip-flop 46, thereby terminating adaptive control. If wheel speed, when synchronous speed is attained, is greater than the reference, the enable to memory 180 is removed and the system reverts to the primary mode, and operates as described above.

We claim:

1. In a vehicle having an axle, a pair of wheels rotatable on said axle, and fluid pressure operated brake means controlling each of said wheels, an adaptive braking system to control actuation of said brake means comprising:
   means for generating a first speed signal proportional to the rotational velocity of the faster rotating wheel and a second speed signal proportional to the rotational velocity of the slower rotating wheel;
   means for comparing said first speed signal with a first reference signal and said second speed signal to a second reference signal, and generating an unbalanced mode signal when said first signal is greater than the first reference signal and said second signal is less than the second reference signal;
   control means generating a synchronous signal after the speed of said faster rotating wheel is substantially synchronous with the speed of said vehicle after generation of said unbalanced mode signal;
   said comparing means including means responsive to said synchronous signal to again compare said second signal with the second reference signal and generating an output signal if the second speed signal is greater than the second reference signal;
   means for selecting one of said speed signals, said selecting means selecting said second signal when said output signal is generated; and
   said control means including means responsive to said selected signal for controlling actuation of said brake means when adaptive control of the latter is initiated.

2. The invention of claim 1:
   means insuring initiation of adaptive control of said brake means when said selecting means selects said second signal.

3. The invention of claim 1:
   said comparing means generating a signal resetting said selecting means after the latter has selected said second signal if said unbalanced mode signal is generated, whereby said selecting means thereafter selects said first speed signal.

4. The invention of claim 1; and
   means for resetting said selecting means upon termination of adaptive control of said brake means if said selecting means has selected said second speed signal.

5. The invention of claim 1;
   said control means including means for differentiating said selected signal to provide a signal proportional to acceleration and deceleration of the corresponding wheel, means for comparing said last-mentioned signal with an acceleration reference signal representing an acceleration level slightly greater than zero acceleration, and means for generating said synchronous signal when said signal proportional to acceleration and deceleration drops below said acceleration reference signal from a value greater than said acceleration reference signal.

6. The invention of claim 1:
   said comparing means generating a locked mode signal when said first speed signal drops below said first speed reference signal;

said control means generating a control signal of varying values in response to said selected signal;

means responsive to said control signal after an adaptive braking cycle is initiated to control the rate of change of fluid pressure operating said brake means as a function of the value of said control signal;

said control means being responsive to said lock mode signal to freeze the value of said control signal, and being responsive to generation of said synchronous signal after generation of said locked mode signal to again compare the value of said first speed signal with said first speed reference signal and terminating adaptive control of said brake means if the value of said first speed signal is less than said first speed reference signal.

7. The invention of claim 6; and
means cancelling said unbalanced mode signal upon generation of said locked mode signal.

8. The invention of claim 6; and
means preventing generation of said locked mode signal after adaptive control of said brake means is initiated until said synchronous signal is generated.

9. The invention of claim 1;
said control means including means responsive to said unbalanced mode signal to decay braking pressure at a predetermined rate.

10. In a vehicle having an axle, a pair of wheels rotatable on said axles and fluid pressure operated brake means controlling each of said wheels, an adaptive braking system to control actuation of said brake means comprising:

means for generating a first speed signal proportional to the rotational velocity of the faster rotating wheel and a second speed signal proportional to the rotational velocity of the slower rotating wheel;

control means responsive to one of said speed signals for generating a control signal of varying values dependent upon the condition sensed by said control means in response to said one speed signal;

means responsive to said control signal after an adaptive braking cycle is initiated to control the rate of change of fluid pressure operating said brake means as a function of the value of said control signal;

said control means including means for generating a synchronous signal after the speed of said faster rotating wheel is substantially synchronous with the speed of said vehicle; and means for comparing said first speed signal with a speed reference signal and generating a locked mode signal if the value of said first speed signal is less than the value of the reference signal, said control means being responsive to generation of said synchronous signal after generation of said locked mode signal to again compare the value of said first speed signal with said speed reference signal and terminating adaptive control of said brake means if the value of said first speed signal is less than said speed reference signal.

11. The invention of claim 10:
said control means being responsive to said locked mode signal to freeze the value of said control signal to thereby maintain the rate of change of braking pressure constant.

12. The invention of claim 10; and means preventing generation of said locked mode signal after adaptive control of said brake means is initiated until said synchronous signal is generated.

13. The invention of claim 10:
said control means including means for differentiating said one signal to provide a signal proportional to acceleration and deceleration of the corresponding wheel, means for comparing said last-mentioned signal with an acceleration reference signal representing an acceleration level slightly greater than zero acceleration, and means for generating said synchronous signal when said signal proportional to acceleration and deceleration drops below said acceleration reference level from a value greater than said acceleration reference signal.

14. In a vehicle having an axle, a pair of wheels rotatable on said axle, and fluid pressure operated brake means controlling each of said wheels, an adaptive braking system to control actuation of said brake means comprising:

means for generating a first speed signal proportional to the rotational velocity of the faster rotating wheel and a second speed signal proportional to the rotational velocity of the slower wheel;

means for selecting one of said speed signals;

control means responsive to said selected signal for controlling actuation of said brake means when adaptive control of the latter is initiated, said control means including means for differentiating said selected signal to provide a signal proportional to acceleration and deceleration of the corresponding wheel, means for comparing said last-mentioned signal with an acceleration reference signal representing an acceleration level slightly greater than zero acceleration, and means for generating an output signal when said signal proportional to acceleration and deceleration drops below said acceleration reference signal from a value greater than said acceleration reference signal;

means for comparing said first speed signal with a first reference signal and said second speed signal to a second reference signal, and generating an unbalanced mode signal relieving braking pressure when said first signal is greater than the first reference signal and said second signal is less than the second reference signal, said comparing means including means responsive to said output signal to again compare said second signal with the second reference signal and generating a selecting signal if second signal is greater than said second reference signal;

said selecting means being responsive to said selecting signal to select said second speed signal.

15. The invention of claim 14:
means insuring initiation of adaptive control of said brake means when said selecting means selects said second signal.

16. The invention of claim 14:
said comparing means generating a signal resetting said selecting means after the latter has selected said second signal if said unbalanced mode signal is generated, whereby said selecting means thereafter selects said first speed signal.

17. The invention of claim 14; and
means for resetting said selecting means upon termination of adaptive control of said brake means if said selecting means has selected said second speed signal.

18. The invention of claim 14:
said control means including means responsive to said unbalanced mode signal to decay braking pressure at a predetermined rate.

19. The invention of claim 14:
said comparing means generating a locked mode signal when said first speed signal drops below said first speed reference signal;
said control means generating a control signal of varying values in response to said selected signal;
means responsive to said control signal after an adaptive braking cycle is initiated to control the rate of change of fluid pressure operating said brake means as a function of the value of said control signal;
said control means being responsive to said locked mode signal to freeze the value of said control signal, and being responsive to generation of said output signal after generation of said locked mode signal to again compare the value of said first speed signal with said first speed reference signal and terminating adaptive control of said brake means if the value of said first speed signal is less than said first speed reference signal.

20. The invention of claim 19:
means cancelling said unbalanced mode signal upon generation of said locked mode signal.

21. The invention of claim 19:
means preventing generation of said locked mode signal after adaptive control of said brake means is initiated until said output signal is generated.

22. In a vehicle having an axle, a pair of wheels rotatable on said axle, and fluid pressure operated brake means controlling each of said wheels, an adaptive braking system to control actuation of said brake means comprising:
means for generating a first speed signal proportional to the rotational velocity of the faster rotating wheel and a second speed signal proportional to the rotational velocity of the slower wheel;
control means responsive to one of said signals for generating a control signal of varying values dependent upon the conditions sensed by said control means in response to said one speed signal, said control means including means for differentiating said one signal to provide a signal proportional to acceleration and deceleration of the corresponding wheel, means for comparing said last-mentioned signal with an acceleration reference signal representing an acceleration level slightly greater than zero acceleration, and means for generating an output signal when said signal proportioanl to acceleration and deceleration drops below said acceleration reference signal from a value greater than said acceleration signal;
means responsive to said control signal when an adaptive braking cycle is initiated to control the rate of change of fluid pressure operating said brake means as a function of said control signal; and
means for comparing said first speed signal with a speed reference signal and generating a locked mode signal if the valve of said first speed signal is less than the value of the reference signal, said control means being responsive to said locked mode signal to freeze the value of said control signal to thereby maintain the rate of change of braking pressure constant, said control means being responsive to generation of said output signal after generation of said locked mode signal to again compare the value of said first speed signal with said speed reference and terminating adaptive control of said brake means if the value of said first speed signal is less than said speed reference signal.

23. The invention of claim 22:
said control means being responsive to said locked mode signal to freeze the value of said control signal to thereby maintain the rate of change of braking pressure constant.

24. The invention of claim 22:
means preventing generation of said locked mode signal after adaptive control of said brake means is initiated until said output signal is generated.

* * * * *